(12) United States Patent
Golden et al.

(10) Patent No.: US 6,278,752 B1
(45) Date of Patent: *Aug. 21, 2001

(54) SYSTEM AND METHOD TO PREVENT ERROR PROPAGATION

(75) Inventors: Glenn David Golden, Boulder, CO (US); Carol Catalano Martin, Fair Haven, NJ (US); Nelson Ray Sollenberger, Tinton Falls, NJ (US); Jack Harriman Winters, Middletown, NJ (US)

(73) Assignees: AT&T Corporation, New York, NY (US); Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,738

(22) Filed: May 2, 1997

(51) Int. Cl.⁷ .............................. H04B 1/10; H04L 1/02; H04J 3/06
(52) U.S. Cl. .................. 375/347; 455/272; 370/509; 370/516
(58) Field of Search .................... 375/354, 330, 375/331, 283, 371, 347, 349; 370/503, 509, 516, 350, 498, 321, 337, 442, 341; 329/304; 455/272, 65, 303, 278.1, 137, 273

(56) References Cited

U.S. PATENT DOCUMENTS

| 5,297,169 |   | 3/1994  | Backström et al. .          |
|-----------|---|---------|-----------------------------|
| 5,499,272 | * | 3/1996  | Bottomley .......... 375/347 |
| 5,621,769 | * | 4/1997  | Wan et al. .......... 375/347 |
| 5,787,131 | * | 7/1998  | Bottomley .......... 375/347 |
| 5,819,168 | * | 10/1998 | Golden et al. ...... 455/303 |
| 5,838,742 | * | 11/1998 | Abu-Dayya .......... 375/347 |

OTHER PUBLICATIONS

David J. Goodman, "Trends in Cellular and Cordless Communications", IEEE Communications Magazine, vol. 29, pp. 31–40, (Jun. 1991).

* cited by examiner

Primary Examiner—Stephen Chin
Assistant Examiner—Betsy L. Deppe
(74) Attorney, Agent, or Firm—Oliff & Berridge, PLC

(57) ABSTRACT

A system and method for generating a coherent reference signal for extracting desired user signals from received signals even after error propagation is underway, are presented. A data symbol preceding a sequence whose relative phases are known is used as an absolute phase reference. Since errors in detection of the phase reference symbol are usually caused by error propagation already underway, the sequence can be used to reacquire the desired signal with merely an absolute phase shift in detected data, which allows accurate differential detection of the desired user signal even in the absence of absolute phase knowledge.

12 Claims, 3 Drawing Sheets

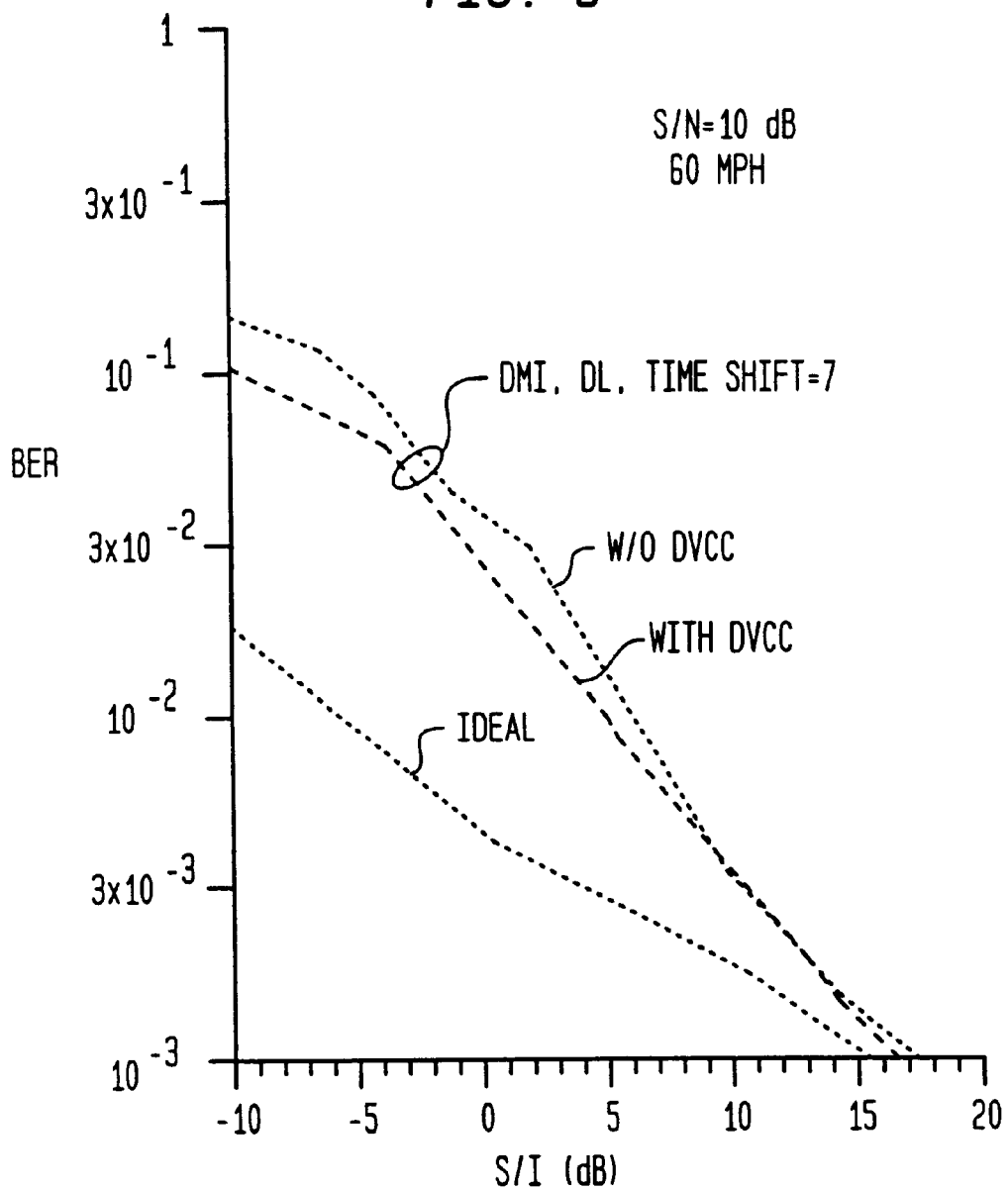

SYSTEM AND METHOD TO PREVENT ERROR PROPAGATION

BACKGROUND OF THE INVENTION

1. Field of Invention

The invention relates to the field of signal processing technology, and particularly to the processing of signals to reduce or prevent error propagation in communication and other systems.

2. Description of Related Art

In communication receiving stations, for example mobile cellular installations, systems equipped with multiple-antenna arrays offer improved receiver performance by sampling and processing the set of signals arriving on antenna channels, and weighting and combining them in efficient ways.

Antenna arrays, as discussed in U.S. Pat. No. 5,819,168 entitled "ADAPTIVE COMMUNICATION SYSTEM AND METHOD USING UNEQUAL WEIGHTING OF INTERFERENCE AND NOISE" filed May 1, 1997 and "TIME-SHIFTED WEIGHTING FOR SIGNAL PROCESSING" filed concurrently herewith and each assigned to the same assignees as this application and U.S. patent application Ser. No. 08/850,896 each incorporated here by reference, can reduce the effect of multipath fading and interference, by deriving weights for each channel that lead to improved receiver performance.

However, in known approaches for receiving the incoming signals to generate channel weights (using a data-derived reference signal), there is a danger that errors in weight generation and signal detection can propagate, causing catastrophic signal loss.

Because of the sequential nature of the processing of receiver signals, even a small error can result in a long error burst. In the weight generation technique reflected in the forementioned U.S. Patent Application "ADAPTIVE COMMUNICATION SYSTEM AND METHOD USING UNEQUAL WEIGHTING OF INTERFERENCE AND NOISE" for instance, the channel is characterized using a 14-symbol or other width sliding window, and deteriorating weight estimates render succeeding weight estimates worse, since the detected symbols used for weight generation are estimated less and less accurately. In the case of mobile wireless communication systems including industry standard IS-136, this can cause a user to lose their telephone or other connection completely. Techniques to avoid error propagation are therefore desirable.

SUMMARY OF THE INVENTION

The invention overcoming these and other shortcomings in the prior art is a system and method which can reduce error propagation, by generating a reference signal which can be used to recover later data in a communication or other signal processing system.

In another aspect the invention provides a system and method which relates to a phase reference technique which recovers from errors occurring once error propagation is underway, by establishing a phase reference for the rest of the data interval.

The system and method achieving these and other advantages in one respect relates to a communication station constructed and method adapted to lock onto data from a specified point in a data frame, using predetermined discrete time data to generate a coherent reference signal within an IS-136 or other transmission sequence.

BRIEF DESCRIPTION OF THE DRAWINGS

The invention will be described with reference to the following drawings:

FIG. 6 illustrates data showing the results of applying the system and method of the invention to certain communication environments.

DETAILED DESCRIPTION OF PREFERRED EMBODIMENTS

Figure 4:
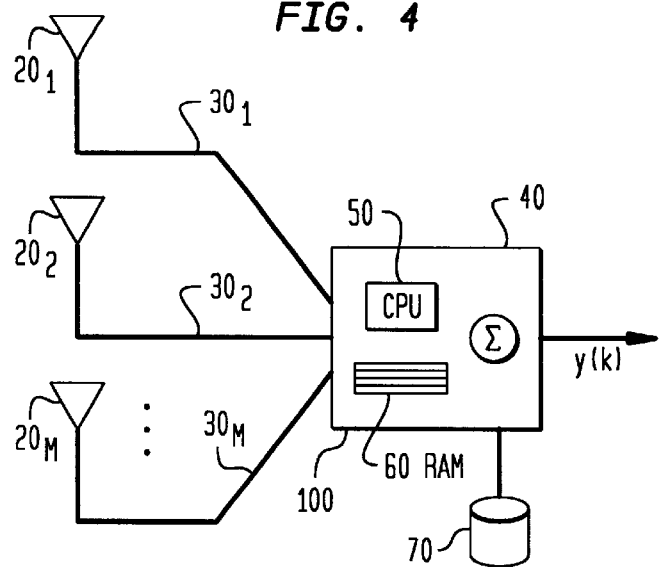
FIG. 4 illustrates a block diagram of a communication station using the system and method to stop error propagation, according to the invention.

As illustrated in FIG. 4 and discussed in the copending applications noted above, the invention is advantageously applied to a communication station 100 having an antenna array, as consisting of a plurality of generally matched antenna elements, $20_1$ through $20_M$. Each antenna element receives RF signals and passes the received signals through corresponding channels $30_1$, through $30_M$ which in turn are connected to processing unit 40, typically containing a CPU 50, electronic memory 60, fixed storage 70, and signal processing and related circuitry and software, connected with appropriate bus and other circuitry, as will be appreciated by persons skilled in the art.

Processing unit 40 is constructed to take samples and apply weights necessary to accurately receive data as described in the forementioned copending U.S. Patent Applications, and generate reference signals to stop error propagation as described herein.

Figure 3:
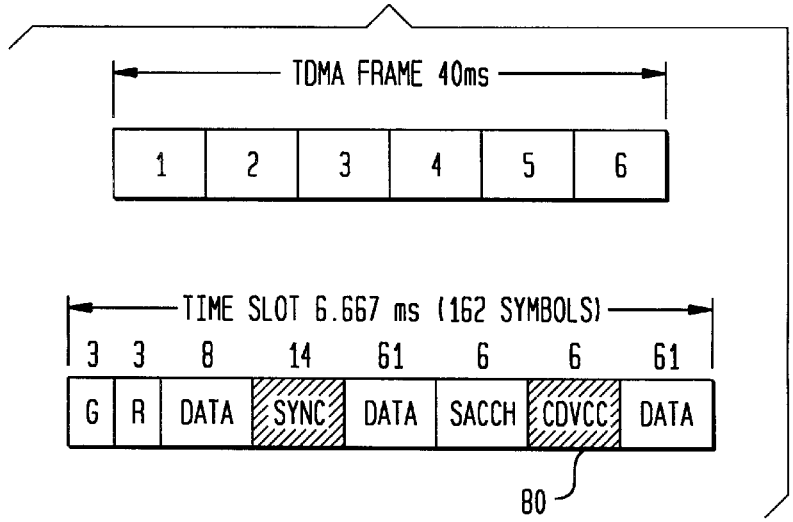
FIG. 3 illustrates the overall frame structure of an IS-136 frame.

In an advantageous embodiment, the invention is employed in a mobile communication system conforming to the IS-136 (TDMA) standard. As illustrated in FIG. 3, in the IS-136 data structure each user is allotted two time slots (at full rate), e.g. time slots 3 and 6 within each TDMA frame. For mobile to base station transmission, each time slot consists of 3 guard symbols, 3 ramp symbols, 130 data symbols, a 14-symbol synchronization sequence, 6-symbol SACCH and 6-symbol CDVCC sequence 80. See, for example, D. L. Goodman, "Trends in Cellular and Cordless Communications", IEEE Communications Magazine, Vol. 29, June 1991, pages 31–40, incorporated by reference.

The predetermined CDVCC sequence 80 identifies the base station to which a mobile unit is assigned, and sequence 80 is permanently stored in communication station 100. Processing unit 40 initially trains on each IS-136 timeslot using the 14-symbol synchronization sequence as the reference signal, with a fixed, but arbitrary absolute phase, as described in the forementioned copending U.S. Patent Applications. While communication station 100 initially trains on the known synchronization sequence, subsequent evaluations of the channel within the timeslot rely upon coherently-sliced versions of received signals.

In mobile and other fading environments, serious degradation occurs once a chain of errors begins to propagate.

Errors can arise from any number of sources, including A/D conversion, estimations of interference, noise and consequently weights calculated from those variables, and otherwise. The data-derived reference signals in the described weight generation approach are coherently detected in processing unit 40. Detection errors result in less accurate weight estimation, increasing error in the weights. This in turn increases the probability of detection error, i.e., bit error rate (BER). Incorrectly detected data bits mean that subsequent estimations of weights will be inaccurate. In short, error propagation can occur, resulting in loss of tracking and a large error burst that can last until the end of the time slot.

Figure 5:
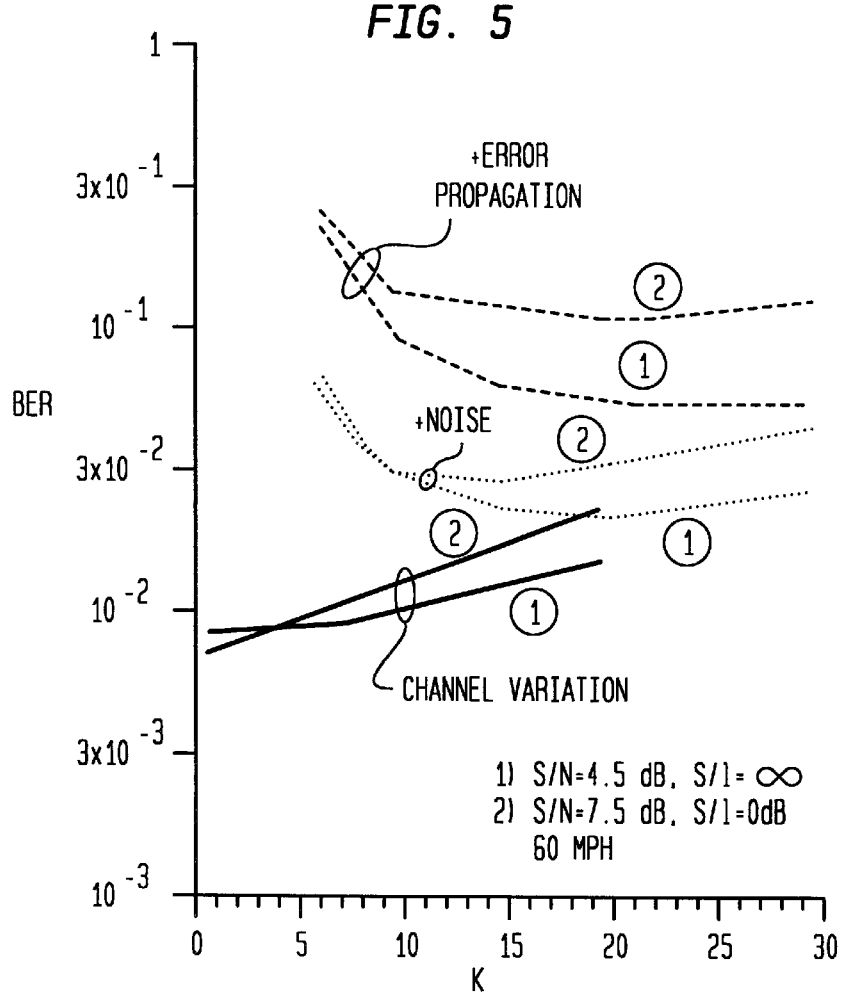
FIG. 5 illustrates data showing the effects of certain types of signal degradation in a mobile communication environment.

FIG. 5 illustrates BER versus sample window length, K, for three types of degradation—channel variation (drift), errors in weight estimation due to noise, and error propagation—with a fading rate of 184 Hz. The two cases are i) signal-to-noise ratio (SNR)=4.5 dB with noise only, and ii) SNR=6.5 dB with an equal power interferer, with signal-to-interference ratio (SIR)=0 dB. The data are for coherent detection of the antenna array output signal, but the inventors have obtained similar results using differential detection. These SNR levels were chosen because they result in a BER of around $10^{-2}$ with ideal weights.

FIG. 5 indicates performance with channel variation only (known channel but averaged over a rectangular window of length K), channel variation and noise, and all three impairments. With channel variation only, the degradation increases monotonically with K. When the effect of noise in the estimation is included, BER is dominated by the effect of noise for small K, but BER decreases with K until the effect of channel variation becomes significant. Error propagation of the type described above is seen to dominate other degradation effects, especially with small K.

In communications systems in which the system and method of the invention is illustratively employed, errors in detecting the data in the array output increase the weight estimation error, in turn increasing BER and possibly resulting in complete tracking loss. However, as illustrated in FIG. 3, in the IS-136 protocol, the 6-symbol CDVCC sequence 80 is present in the middle of the time slot, and this sequence is known at communication station 100. The inventors propose to use the CDVCC sequence 80 to begin a process of recovery from error propagation at that point.

When error propagation is underway, there is a compounding effect since poorly estimated weights are applied to the next incoming signal samples used for data detection, whose value is thus less accurately determined in the next coherently-sliced data-derived reference symbol, leading to yet another inferior estimation of the weight, and so on. As noted, the data stream eventually reaches the portion of the IS-136 time slot in which the CDVCC sequence 80 is to appear. That sequence 80 can be used to halt error propagation beyond that point, if processed appropriately.

Figure 1A:
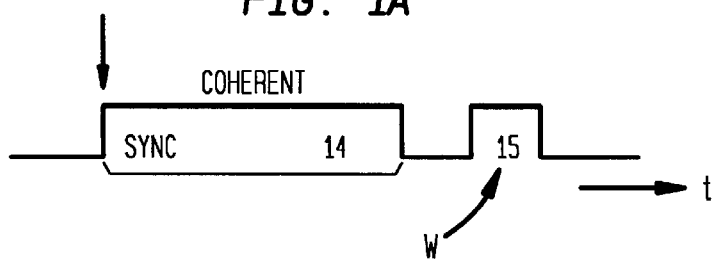
FIGS. 1(a) and 1(b) illustrate the received data weight sequence as described in the forementioned U.S. Patent Application entitled "ADAPTIVE COMMUNICATION SYSTEM AND METHOD USING UNEQUAL WEIGHTING OF INTERFERENCE AND NOISE"
Figure 1B:
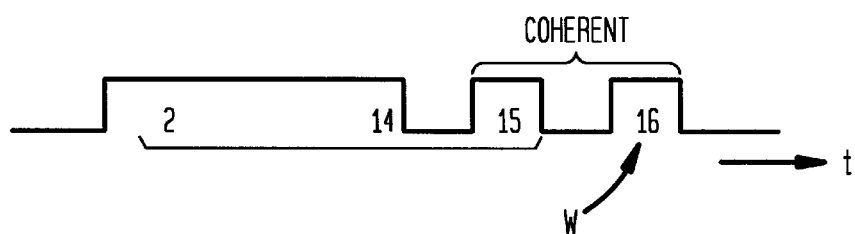
Figure 2:
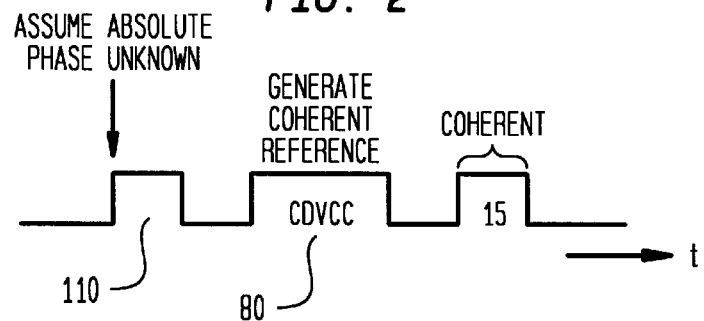
FIG. 2 illustrates the data sequence and corrective action of the invention.

However, while the processing unit 40 processes the received signal samples to that point in a coherently-sliced fashion to generate weights, the CDVCC sequence 80 is encoded in differential phase shifts, rather than coherent phases. In the invention, to combat the continuation of error propagation a data symbol 110 adjacent to CDVCC sequence 80 is selected as a phase reference signal. Illustratively, the symbol preceding CDVCC sequence 80 is shown in FIG. 2. That is, the detected phase of data symbol 110 is assumed to represent the correct absolute phase value (such as 0°).

The next set of symbols are the set of 6 symbols of the predetermined CDVCC sequence. Rather than rely upon the detected value of these symbols, the communication station 100 already has the value of the CDVCC sequence 80 stored in memory 60, and at that time reads the differential phase shift values of the CDVCC sequence from memory. Processing unit 40 uses those stored values to create CDVCC-generated coherent reference symbols, using the assumed correct absolute phase value of symbol 110. If the phase of phase reference symbol 110 is detected correctly, then the absolute phase of the following CDVCC-generated reference signal will also be correct. However, in that case establishing absolute phase values is probably not necessary, since the system may be functioning properly.

In the case that the absolute phase of phase reference symbol 110 has not been detected correctly, then the phase orientation effect of the invention will come into play. When the absolute phase of reference symbol 110 is incorrect, of course the phase of the CDVCC-generated coherent reference signal will be incorrect. However, recovery is still possible.

If the error in the detection of phase reference symbol 110 was an isolated error, then the CDVCC-generated coherent reference symbols could increase the weight estimation error since continued detection of the received symbols may have been correct. However, the probability of this happening is relatively low, since the error in the phase of the phase reference symbol 110 is more likely to be due to error propagation that is already underway.

In this more likely case, the resetting of absolute phase based on phase reference symbol 110 can stop the error propagation. This is because while the phase of phase reference symbol 110 was incorrect, the relative phases of the predetermined CDVCC sequence 80 are already known. Therefore, the coherently determined phases derived from that sequence 80, and that of following data, will be off merely by some fixed phase error. In other words, the absolute phase will be inaccurate, but relative phases of detected data will be preserved and the weights will adjust to this absolute phase.

In this case, the subsequent data symbols in the IS-136 time slot may be recovered, since most commercial base stations detect actual data in differential fashion. In the invention the extent of error propagation is therefore greatly reduced or eliminated subsequent to the CDVCC sequence.

FIG. 6 illustrates BER versus SIR (or S/I) with SNR=0 dB with and without the use of CDVCC-based reference signal generation according to the invention. (Diagonal loading and time-shifting of 7, as described in the aforementioned copending patent applications, are also used). The use of CDVCC in the invention reduces the required SNR needed to achieve a BER of $10^{-2}$ by more than 1 dB. This gain increases with increasing BER.

The foregoing description of the system and method of the invention is illustrative, and variations in construction and implementation will occur to persons skilled in the art. For instance, while recovery based on the phase orientation of the symbol preceding the CDVCC sequence is illustrated, other known sequences could be used, as could communication systems using other than IS-136 protocols. The invention is accordingly intended to be limited only by the following claims.

What is claimed is:

1. A method for generating a coherent reference signal for use in generating weights for signal processing to reduce error propagation in a cellular communication receiving station equipped with a multiple-antenna array, comprising:

combining signals generated by the multiple-antenna array to generate a data stream;

estimating a phase of a reference symbol in the data stream;

generating the coherent reference signal from known differentially encoded symbols based on the estimated phase of the reference symbol.

2. The method of claim 1 wherein the known differentially encoded symbols comprise the 6-symbol CDVCC sequence of an IS-136 frame.

3. The method of claim 2 wherein the phase reference symbol comprises a data symbol immediately preceding the 6-symbol CDVCC sequence.

4. The method of claim 3 wherein the data stream comprises the data portions of an IS-136 frame.

5. The method of claim 4 further comprising the step of:

differentially detecting the data subsequent to the 6-symbol CDVCC sequence.

6. The method of claim 1, further comprising:

using the multiple antenna array in conjunction with the coherent reference signal to reduce the effect interference from other users.

7. An apparatus for generating a coherent reference signal for use in generating weights for signal processing to reduce error propagation in cellular communications, comprising:

a multiple-antenna array, wherein a data stream is generated by combining signals received from the multiple-antenna array;

a phase estimation unit for estimating a phase of a phase reference symbol in the data stream; and a generator unit for generating a coherent reference signal from known differentially encoded symbols based on the estimated phase of the phase reference symbol.

8. The apparatus of claim 7 wherein the differentially encoded symbols comprise the 6-symbol CDVCC sequence of an IS-136 frame.

9. The apparatus of claim 8 wherein the phase reference symbol comprises a data symbol immediately adjacent to the 6-symbol CDVCC sequence.

10. The apparatus of claim 9 wherein the data stream comprises the data portions of an IS-136 frame.

11. The apparatus of claim 10 wherein the data subsequent to the 6-symbol CDVCC sequence is differentially detected.

12. The apparatus of claim 7, further comprising:

a communication station that uses the multiple antenna array in conjunction with the coherent reference signal to reduce the effect of interference from other users.

* * * * *